Nov. 9, 1943.  E. R. DAVIES ET AL  2,333,768
AERIAL CAMERA
Filed June 23, 1941   2 Sheets-Sheet 1

INVENTOR
EDWARD R. DAVIES
EDWARD W. H. SELWYN
JOSEPH M. OTAZU

ATTORNEYS.

Nov. 9, 1943.  E. R. DAVIES ET AL  2,333,768
AERIAL CAMERA
Filed June 23, 1941  2 Sheets-Sheet 2

INVENTOR
EDWARD R. DAVIES
EDWARD W.H. SELWYN
JOSEPH M. OTAZU
BY
ATTORNEYS.

Patented Nov. 9, 1943

2,333,768

UNITED STATES PATENT OFFICE 2,333,768

AERIAL CAMERA

Edward Roy Davies, Edward William Herbert Selwyn, and Joseph Marcel Otazu, Wealdstone, England, assignors to Eastman Kodak Company, Rochester, N. Y., a corporation of New Jersey Application June 23, 1941, Serial No. 399,390
In Great Britain July 1, 1940

3 Claims. (Cl. 88—16.8)

The present invention relates to photographic cameras for use in taking photographs from aircraft.

In taking aerial photographs there are several factors which cause a lack of definition in the resulting photograph, but at low altitudes the most important factor to be taken into account is the translational movement of the aircraft over the ground, and this factor determines the maximum exposure time which can be given whilst maintaining a predetermined standard of definition. It will be apparent, therefore, that it is desirable to provide an aerial camera with means for increasing this maximum time of exposure, not only from the point of view that it may not be possible to obtain an exposure fast enough to compensate for the motion of the aircraft, but because the longer the exposure that can be given, the better will be the results obtained under poor lighting conditions. In an effort to solve this problem it has previously been proposed to advance the film through the camera continuously, the velocity of the film being proportional to the speed of the aircraft and inversely proportional to the altitude of the aircraft. However, when taking aerial photographs it is an advantage to produce photographs of areas of ground covered by successive exposures which overlap to a certain extent so that the photographs may be readily pieced together. With this prior proposal it is only possible to produce this overlap by moving the film more rapidly between exposures than during the exposure, thus necessitating the employment of complicated mechanism.

It is the primary object of the present invention to compensate for the translational movement of the aircraft by rotatably mounting a plane parallel glass plate between the camera objective and the photographic film. This glass plate is rotated at an angular velocity proportional to the speed of the aircraft and inversely proportional to the height of the aircraft, the axis of rotation of the plate being perpendicular to the optical axis of the objective and the direction in which the aircraft is travelling.

Another object of the invention is to provide such a camera with a single prime mover for effecting the film feed operation of the shutter and rotation of the glass plate. A further object is the provision in such a camera of a shutter which is adjustable to any one of a number of constant speeds and which is not affected by varying the angular velocity of the glass plate. Thus, the rotational speed of the plate may be set for any desired value without affecting the speed of the shutter, although the frequency of operation of the shutter will be varied in proportion to the angular velocity of the plate.

Still another object of the invention is the provision in such a camera of an intermittent film feed so that the film is stationary during the exposure period, the image shift being compensated for by the rotary plate. A still further object of the invention is to provide a continuous film feed and to employ a glass plate to compensate for the movement of the film and the translational movement of the aircraft so that overlapping may be obtained between consecutive pictures with continuous film feed.

Other and further objects of the invention will be suggested to those skilled in the art by the disclosure which follows.

Reference is now made to the accompanying drawings wherein similar reference characters designate similar elements and wherein—

Figure 1:
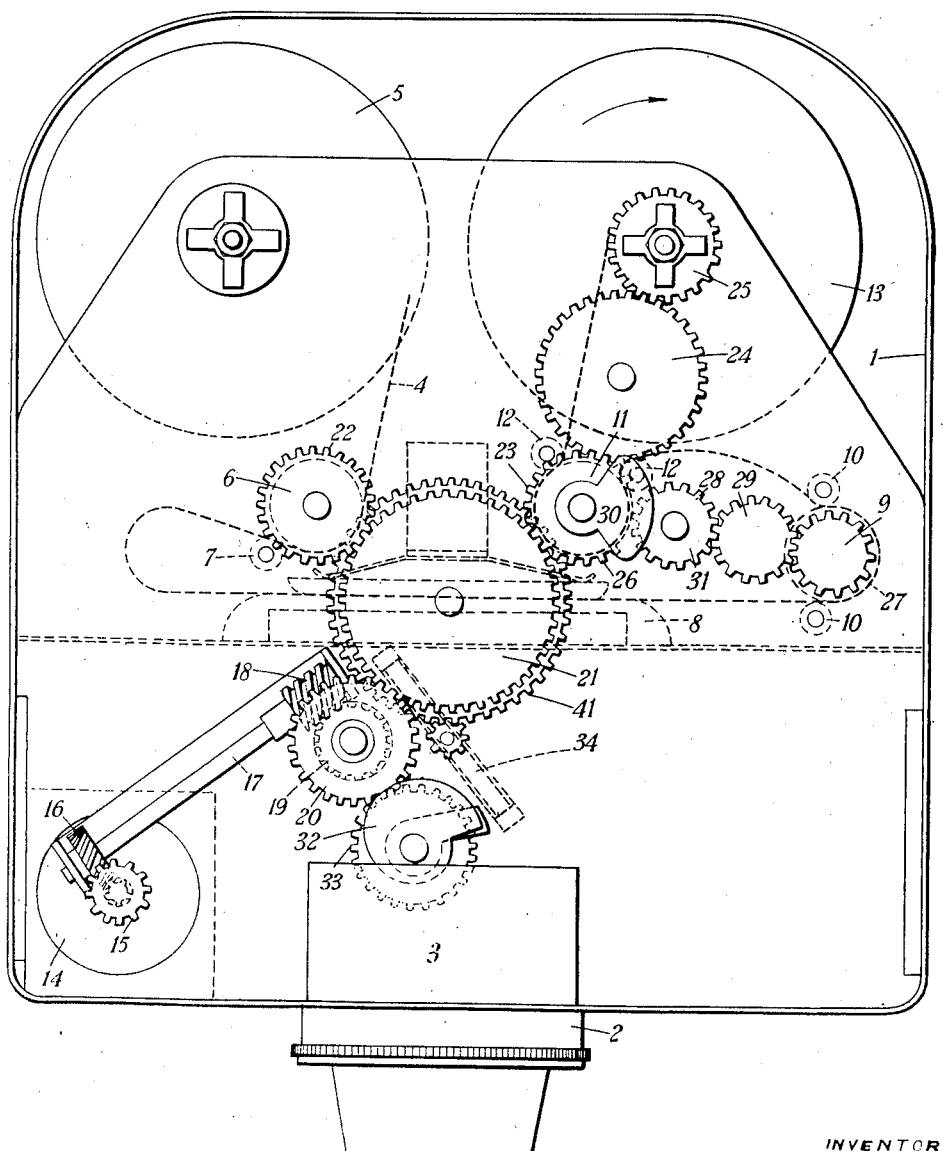
Fig. 1 is a diagrammatic view of an aerial photographic camera and illustrates by way of example a preferred form of the present invention.
Figure 2:
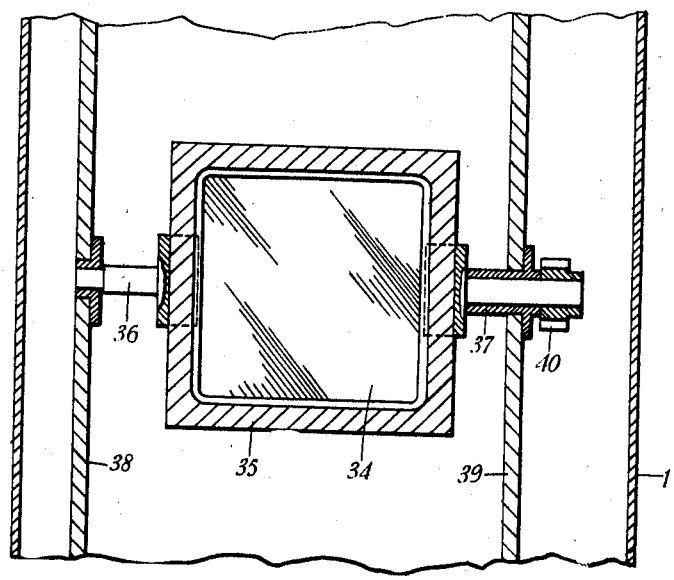
Fig. 2 is a section through the camera showing the means for mounting the plane parallel glass plate.

Referring now to the form of the invention illustrated by way of example, an aerial photographic camera comprises a body portion 1, an objective 2 and a shutter 3, of any well known type. The film 4 is led over a supply reel 5, under a sprocket 6, with which the marginal perforations are held in engagement by means of a pressure roller 7, through a film gate 8, round a sprocket 9, with which it is held in engagement by means of a pair of pressure rollers 10, round a third sprocket 11, having a pair of co-operating pressure rollers 12, and on to a take-up spool 13.

The sprockets and take-up spool are driven through a prime mover 14, such as an electric motor, by means of a pinion 15, carried by the latter and engaging a worm wheel 16 mounted on a shaft 17 carrying at its other end a second worm wheel 18. The latter engages a pinion 19 mounted co-axially with a gear wheel 20 which is in mesh with a main driving gear wheel 21. A pair of gear wheels 22, 23 mounted co-axially with the sprockets 6 and 11 respectively, are in engagement with the gear wheel 21 to impart continuous movement to the film 4. The gear 23 is also in engagement with a larger gear 24 in mesh with a pinion 25 which is connected to the shaft of the take-up spool 13 by means of a slipping clutch to compensate for the increasing diameter of the take-up reel.

According to the form illustrated by way of example, the film 4 is moved intermittently through the film gate 8 in order that the film may be stationary during the exposure period. For this purpose a second gear 26 is mounted co-axially with the sprocket 11 and drives the sprocket 9 through a gear 27 mounted co-axially therewith and two intermediate pinions 28, 29. The gear 26 has a mutilated portion such that although the film is driven continuously by sprocket 11 it is pulled through the gate intermittently by the sprocket 9 and is, in fact, held stationary when the mutilated portion of the gear 26 is adjacent the intermediate pinion 28. In order to prevent slippage between the mutilated gear 26 and the pinion 28 when the mutilated portion is opposite the latter, the gear 26 carries a sector 30 which is adapted to engage a cut-away portion of a disc 31 carried by the pinion 28. A film loop is formed between sprocket 6 and the film gate 8 and between the sprockets 9 and 11 to compensate for the intermittent movement of the film through the film gate.

As illustrated, the operation of the shutter 3 is controlled by means of a cam 32 mounted co-axially with a gear 33 in engagement with the gear 20, the configuration of the cam being such that the shutter is fired during the stationary period of the film. However, the means for operating the shutter and intermittently feeding the film through the film gate are well known and form no part of the present invention.

In accordance with the invention, the translational movement of the aircraft over the ground is compensated by means of a plane parallel glass plate 34 which is rotatably mounted between the objective 2 and the film gate 8. As illustrated, the plate 34 is rectangular in shape and mounted in a frame 35 carrying a pair of trunnions 36, 37 rotatably mounted in a pair of walls 38, 39 respectively in the interior of the camera. The trunnion 37 has a pinion 40 secured thereto within the chamber formed by the wall 39 and the casing of the camera 1, this chamber also forming a housing for the aforementioned gears and driving motor. The pinion 40 is in mesh with a gear 41 mounted coaxially with the main driving gear 21 and it will be apparent therefore that the film feed, operation of the shutter and rotation of the plate are effected from a single prime mover which can be run continuously to obtain a series of overlapping photographs. The axis of rotation of the plate 34, that is. the trunnions 36, 37, must be perpendicular to the optical axis of the objective and to the direction in which the camera is moved by the aircraft.

It will be apparent that in order to obtain an overlap between adjacent photographs, the frequency of taking pictures must be proportional to the velocity of the aircraft and inversely proportional to the height of the aircraft. Furthermore, the movement of the image bears the same relation to the speed and height of the aircraft so that the film forwarding-mechanism, plate rotating mechanism and shutter operating mechanism may be driven by a common source of motive power.

It should be noted that if the plate is very thick, the angular velocity is necessarily very slow, and, furthermore, great thickness introduces serious aberrations. On the other hand, however, if the plate is extremely thin, it must be rotated at a high speed and introduces astigmatism. Furthermore, the translational movement of the image caused by the glass plate is not proportional to the amount of rotation of the plate from the zero position, except for small amounts of rotation, so that if the plate is very thin the movement of the image cannot be compensated for very exactly owing to the large angle of rotation which is necessary.

Assuming that the camera is employing an objective having a focal length of 100 mm. and the plate has a refractive index of 1.5, the following theoretical values are obtained.

| V | H | t=2 mm. | | t=5 mm. | | t=10 mm. | |
|---|---|---|---|---|---|---|---|
|   |   | T | w | T | w | T | w |
| M. P. H. | Ft. | | | | | | |
| 200 | 1,000 | 1/30 | 7 | 1/72 | 2.8 | 1/144 | 1.4 |
| 400 | 1,000 | 1/60 | 14 | 1/144 | 5.6 | 1/89 | 2.8 |
| 400 | 500 | 1/20 | 28 | 1/288 | 11.2 | 1/177 | 5.6 | where V is the speed and H the height of the aircraft, $t$ the thickness of the plate, T the exposure time in seconds and $w$ the angular velocity of the plate in revs./sec.

Futhermore, in view of the small angle through which the plate turns during the actual exposure, the camera objective may be corrected for the aberrations due to the glass plate, such correction being effected with the plate in the horizontal position.

Although any type of shutter may be employed it is preferred to use a shutter which may be set to any one of a number of constant speeds and which is not affected by varying the angular velocity of the plate. Thus the rotational speed of the plate may be set for any desired value without affecting the speed of the shutter, although the frequency of operation of the shutter will be varied in proportion to the angular velocity of the plate.

If desired, the film may be driven continuously through the film gate and the plate employed to compensate for both the movement of the film and the translational movement of the aircraft. For example, if it is desired to have, say a 50% overlap between adjacent pictures, the speed of the film may be twice that required to hold the image stationary with respect to the film and the plate rotated at the same angular velocity but in the opposite direction to that in which it would be rotated if the film were stationary during the exposure, since the image lags behind the film movement. Furthermore, the continuous drive of the film may be effected in the apparatus illustrated by way of example, by substituting a normal gear wheel for the mutilated gear 26.

While certain specific embodiments of the invention have been disclosed, it is apparent that the inventive idea may be carried out in a number of ways. The present application is therefore not to be limited to the precise details disclosed, but is intended to cover all variations and modifications thereof which fall within the scope of the appended claims.

Having now particularly described our invention, what we desire to secure by Letters Patent of the United States and what we claim is:

1. In an aerial photographic camera having an objective, a film gate, a film feeding mechanism for imparting intermittent movement to the film such that it is stationary during the exposure period and a shutter, the combination of a plane parallel glass plate disposed between the said objective and film gate, means for rotatably mounting said plate with its axis of rotation perpendicular to the optical axis of the objective and the direction of travel of the aircraft to which the camera is applied and a prime mover for simultaneously effecting operation of the shutter, actuation of the film feeding mechanism and rotation of said plate at an angular velocity proportional to the speed and inversely proportional to the height of the aircraft such that said plate compensates for the translational movement of the aircraft during exposure.

2. In an aerial photographic camera having an objective, a film gate, a film feeding mechanism for imparting intermittent movement to the film such that it is stationary during the exposure period and a shutter, the combination of a plane parallel glass plate disposed between the said objective and film gate, a frame in which said plate is mounted, a pair of trunnions which are carried by the frame and have their axis of rotation perpendicular to the optical axis of the objective and the direction of travel of the aircraft to which the camera is applied, and a prime mover for simultaneously effecting operation of the shutter, actuation of the film feeding mechanism and rotation of said trunnions at an angular velocity proportional to the speed and inversely proportional to the height of the aircraft such that said plate compensates for the translational movement of the aircraft during exposure.

3. In an aerial photographic camera having an objective, a film gate, a film feeding mechanism for imparting intermittent movement to the film such that it is stationary during the exposure period and a shutter, the combination of a plane parallel glass plate having a refractive index of 1.5 and a thickness between 2 and 10 mm. and disposed between the said objective and film gate, means for rotatably mounting said plate with its axis of rotation perpendicular to the optical axis of the objective and the direction of travel of the aircraft to which the camera is applied and a prime mover for simultaneously effecting operation of the shutter, actuation of the film feeding mechanism and rotation of said plate at an angular velocity proportional to the speed and inversely proportional to the height of the aircraft such that said plate compensates for the translational movement of the aircraft during exposure.

EDWARD ROY DAVIES.
EDWARD WILLIAM HERBERT SELWYN.
JOSEPH MARCEL OTAZU.